(12) United States Patent
Lawrenson et al.

(10) Patent No.: US 9,620,029 B2
(45) Date of Patent: Apr. 11, 2017

(54) METHOD AND DEVICE FOR IDENTIFYING BEHAVIOUR OF A VEHICLE DRIVER

(71) Applicant: TELEFONAKTIEBOLAGET L M ERICSSON (PUBL), Stockholm (SE)

(72) Inventors: Matthew John Lawrenson, Lausanne (CH); Julian Charles Nolan, Lausanne (CH)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 581 days.

(21) Appl. No.: 14/066,374

(22) Filed: Oct. 29, 2013

(65) Prior Publication Data

US 2015/0118652 A1 Apr. 30, 2015

Related U.S. Application Data

(63) Continuation of application No. PCT/EP2013/072615, filed on Oct. 29, 2013.

(51) Int. Cl.
G09B 9/04 (2006.01)
G06Q 30/02 (2012.01)
G06Q 50/20 (2012.01)
G06Q 50/30 (2012.01)
G06Q 50/26 (2012.01)

(52) U.S. Cl.
CPC ............... *G09B 9/04* (2013.01); *G06Q 30/02* (2013.01); *G06Q 50/20* (2013.01); *G06Q 50/265* (2013.01); *G06Q 50/30* (2013.01)

(58) Field of Classification Search
CPC ...... G06Q 30/02; G06Q 50/30; G06Q 50/265; G09B 19/00; G09B 9/04
USPC .......................................................... 434/62
See application file for complete search history.

(56) References Cited

U.S. PATENT DOCUMENTS 5,394,136 A * 2/1995 Lammers ............... G07C 5/008
340/438
2008/0243558 A1* 10/2008 Gupte .................... G06Q 40/08
705/4

* cited by examiner

Primary Examiner — Robert J Utama
Assistant Examiner — Jerry-Daryl Fletcher
(74) Attorney, Agent, or Firm — Rothwell, Figg, Ernst & Manbeck, P.C.

(57) ABSTRACT

The disclosure provides a method, performed in a first communication unit (2). The method comprises the steps of identifying a rewardable behavior of a driver (10) of a vehicle (9), checking first storing means (6) for a reward that corresponds to the rewardable behavior, collecting the reward from the first storing means (6), and transmitting the reward to a second communication unit (3) connected to the vehicle (9). The disclosure also provides corresponding devices for performing the method.

27 Claims, 6 Drawing Sheets

METHOD AND DEVICE FOR IDENTIFYING BEHAVIOUR OF A VEHICLE DRIVER

CROSS REFERENCE TO RELATED APPLICATION(S)

This application is a continuation of PCT International Application No. PCT/EP2013/072615, filed Oct. 29, 2013, the disclosure of which is incorporated herein in its entirety by reference.

TECHNICAL FIELD

The disclosure pertains to the field of monitoring and assessing behaviour of a driver of a vehicle.

BACKGROUND

The increasing number of vehicles in the world puts high demands on the behaviour of the driver in order to avoid accidents and traffic congestion. Monitoring and assessing driver behaviour has been done by law enforcement units to penalise bad behaviour. However, monitoring a long term good behaviour has also been done in order to promote, for example, reduced fuel consumption or reduced speed and acceleration in order to avoid accidents.

US 2008/0243558 (D1) describes a system for monitoring driving behaviour with feedback. The preferred embodiment involves monitoring a vehicle's position, direction and acceleration as an indicator of driving behaviour. This is done using GPS equipment or on-vehicle sensors. The driving behaviour is reported back to the driver or forward to data centres and possibly rewarding good driving behaviour. The central data processing centre aids in giving real-time feedback and potential real-time rewards to good drivers. An example of a reward is reduced insurance premiums.

WO 2012/156909 (D2) describes a method of implementing a fuel related reward for a driver of a motor vehicle and a system therefore. A telematics device installed in the vehicle monitors speed, acceleration etc and transmits data to a server over a communication network. The data is transmitted either real-time or periodically. The data is analyzed and a driving score is determined. If receiving a good score, the driver is rewarded with a fuel refund.

SUMMARY

It is known from prior art to monitor driver behaviour by use of on-board equipment and then to retroactively reward a long term good driving behaviour from a driver with respect to vehicle parameters according to the above. However, there is a need to directly promote a good behaviour in relation to fellow drivers as an incentive to help each other and to increase the awareness of the benefits of interactive and helpful behaviour, for example in order to avoid accidents and increase smooth interweaving of vehicles in the traffic.

This disclosure discloses a method performed in a first communication unit. The method comprises the steps of identifying a rewardable behaviour of a driver of a vehicle and then checking first storing means for a reward that corresponds to the rewardable behaviour, collecting the reward from the first storing means and then transmitting the reward to a second communication unit connected to the vehicle.

One advantage is the possibility of a direct reward for a behaviour that is considered to be beneficial to a fellow driver. This is possible due to that immediately after identification of a behaviour it is possible to check a list of rewards connected to corresponding behaviours and if a reward is found, it can be transmitted directly to the second communication unit. Hence, the second communication unit comprises means for receiving the reward and the first communication unit comprises means that can transmit the reward, which will be explained further below. Another advantage is the possibility for drivers to apologise for mistakes and compensate other drivers that have been inconvenienced.

According to one aspect of the disclosure, the method further comprises monitoring of predetermined parameters related to the driving behaviour of the driver, comparing the parameter(s) with a predetermined set of rewardable behaviour scenarios stored in the first storing means for finding a reward matching the behaviour, and then transmitting a matching reward to the second communication unit when the predetermined parameters match a rewardable behaviour scenario.

One Advantage is that the Monitoring Allows for an Automatic Evaluation of Driver Behaviour.

According to another aspect of the disclosure, the method further comprises the step of receiving a pre-determined vehicle parameter or set of vehicle parameters from a second sensor system in the vehicle. The parameters are connected to the driving behaviour of the driver. The parameter(s) are compared with a predetermined set of rewardable behaviour scenarios stored in the first storing means for finding a reward matching the behaviour, wherein a matching reward is transmitted to the communication unit when the predetermined parameters match a rewardable behaviour scenario.

One advantage of receiving pre-determined parameters from a vehicle, is that it allows for an automatic evaluation of a driver behaviour made by a machine as well as a manual evaluation made by a human.

According to another aspect of the disclosure, the method further comprises the step of requesting setup of a communication link with the second communication unit. The request is triggered by a user of the first communication unit, or the request is triggered by the second transceiver being in range of the first transceiver, or the request is triggered by the second communication unit logging in on a network on which the first communication unit being also logged in to.

The different possibilities for setting up the communication link allows for different scenarios for sending the reward.

According to another aspect of the disclosure, the method further comprises the step of identifying a rewardable behaviour of the driver of the vehicle by input from a user of the first communication unit.

One advantage is that the reward can be transmitted on the volition of a user of the first communication unit, simply because the user considers a behaviour of a driver of a vehicle to be rewardable.

According to an aspect of the disclosure, the method further comprises the steps of receiving a reward from the second communication unit and then storing the reward in the first storing means for further use by the first communication unit and/or for displaying the reward in the first communication unit.

One advantage is that a driver of a vehicle having access to the first communication unit can receive a reward for good behaviour in traffic and is free to either use a part or all of the reward or to forwarding a part or all of the reward to another driver having shown good behaviour.

According to an aspect of the disclosure, the method further comprises monitoring a pre-determined parameter or set of vehicle parameters connected to the driving behaviour of the driver of the vehicle connected to the first communication unit, and then transmitting the parameter(s) to the second communication unit.

One advantage is that the monitoring and transmitting of the parameters allows for an automatic identification of the behaviour of the driver.

This disclosure also discloses a method performed in a second communication unit in a vehicle. The method comprises the steps of receiving a reward from a first communication unit and storing the reward in second storing means for further use by the second communication unit and/or for displaying the reward in the second communication unit.

One advantage is that a driver of a vehicle having access to the second communication unit can receive a reward for good behaviour in traffic and is free to either use a part or all of the reward or to forward a part or all of the reward to another driver having shown good behaviour.

According to one aspect of the disclosure, the method further comprises the steps of identifying a rewardable behaviour of a driver of a vehicle connected to the first communication unit or a third communication unit. The second storing means is then checked for a reward that corresponds to the rewardable behaviour. The reward is then collected from the second storing means and the reward is transmitted to the first communication unit or the third communication unit.

One advantage is the possibility of a direct reward for a behaviour that is considered to be beneficial to a fellow driver. Another advantage is the possibility to use the reward having been received as a reward to another driver for having shown a good behaviour. Another advantage is that the user of the second communication unit can return a different reward to the giver as a token of appreciation.

According to another aspect of the disclosure, the method performed in the second communication unit further comprises the step of monitoring a pre-determined vehicle parameter or set of vehicle parameters connected to the driving behaviour of the driver of the vehicle connected to the second communication unit, and then transmitting the parameter(s) to the first communication unit.

One advantage by monitoring and transmitting pre-determined parameters from a vehicle, is that it allows for an automatic evaluation of a driver behaviour made by a machine as well as a manual evaluation made by a human.

According to another aspect of the disclosure, the method performed in the second communication unit further comprises the step of monitoring predetermined parameters related to the driving behaviour of the driver. The parameter(s) are then compared with a predetermined set of rewardable behaviour scenarios stored in the second storing means for finding a reward matching the behaviour. A matching reward is then transmitted to the first communication unit when the predetermined parameters match a rewardable behaviour scenario.

One advantage is that the monitoring allows for an automated process of evaluating behaviour and transmitting rewards.

According to another aspect of the disclosure, the method performed in the second communication unit further comprises the step of receiving a pre-determined vehicle parameter or set of vehicle parameters from a third sensor system in the vehicle. The parameters are connected to the driving behaviour of the driver. The parameter(s) from the third sensor system are compared with a predetermined set of rewardable behaviour scenarios stored in the second storing means for finding a reward matching the behaviour. A matching reward is then transmitted to the first communication unit when the predetermined parameters match a rewardable behaviour scenario.

One advantage is that the monitoring allows for an automated process of evaluating behaviour and transmitting rewards.

According to another aspect of the disclosure, the method performed in the second communication unit further comprises identifying a rewardable behaviour of the driver of the vehicle by input from a user of the second communication unit.

One advantage is that the user has the possibility to make assessments based on feelings and/or perception and/or other parameters such as safety etc.

This disclosure also discloses a method performed in a communication system comprising a first communication unit and a second communication unit according to the above.

One advantage is that the system allows for interaction between drivers in order to promote good behaviour in traffic.

The above stated advantages are in the following correspondingly valid for the devices performing corresponding methods.

This disclosure also discloses a first communication unit comprising a first transceiver. The first communication unit comprises or being connected to first storing means for storing awards. The first communication unit comprises a first identification device being configured to identify a rewardable behaviour of a driver of a vehicle connected to a second communication unit. The first identification device is configured to check the first storing means for a reward that corresponds to the rewardable behaviour. The first identification device is configured to collect the reward from the first storing means. The first identification device is configured to communicate with the first transceiver, wherein the first transceiver is configured to transmit the reward to the second communication unit.

According to another aspect, the first communication unit is further configured to be connected to or comprising a first sensor system being configured to monitor predetermined parameters related to the behaviour of the vehicle. The first identification device is configured to compare the parameter(s) from the first sensor system with a predetermined set of rewardable behaviour scenarios stored in the first storing means for finding a reward matching the behaviour, and the first transceiver is configured to transmit a matching reward to the second transceiver when the predetermined parameters match a rewardable behaviour scenario.

According to another aspect, the first identification device, via the first transceiver, is further configured to receive a pre-determined vehicle parameter or set of vehicle parameters from a second sensor system in the vehicle. The parameters are connected to the driving behaviour of the driver. The first identification device is configured to compare the parameter(s) from the second sensor system with a predetermined set of rewardable behaviour scenarios stored in the first storing means for finding a reward matching the behaviour. The first transceiver is configured to transmit a matching reward to the second transceiver when the predetermined parameters match a rewardable behaviour scenario.

According to another aspect, the first communication unit is further configured to request setup of a communication link with the second communication unit. The request is triggered by a user of the first communication unit or the request is triggered by the second transceiver being in range of the first transceiver or wherein the request is triggered by the second communication unit logging in on a network on which the first communication unit being also logged in to.

According to another aspect, the first identification device is further configured to identify a rewardable behaviour of the driver of the vehicle by input from a user of the first communication unit.

According to one aspect, the first communication unit is further configured to receive a reward from the second communication unit and storing the reward in the first storing means for further use by the first communication unit and/or for displaying the reward in the first communication unit.

According to another aspect, the vehicle further comprises a third sensor system being configured to monitor a pre-determined parameter or set of vehicle parameters connected to the driving behaviour of the driver connected to the first communication unit and the first transceiver is configured to send the parameter(s) from the third sensor system to the second identification device via the second transceiver.

This disclosure also discloses a second communication unit comprising a second transceiver and the second communication unit comprises or is connected to a second storing means. The second transceiver is configured to receive a reward from the first communication unit. The second transceiver is configured to communicate with the second storing means, wherein the second storing means is configured to store the reward for further use by the second communication unit and/or for displaying the reward in the second communication unit.

According to another aspect, the second communication unit further comprises a second identification device. The second identification device is configured to identify a rewardable behaviour of a driver of a vehicle connected to the first communication unit or a third communication unit. The second identification device is configured to check the second storing means for a reward that corresponds to the rewardable behaviour. The second identification device is configured to collect the reward from the second storing means. The second identification device is configured to communicate and transmit the reward to the first communication unit or the third communication unit.

According to another aspect, the second communication unit is further configured to be connected to or comprising a fourth sensor system being configured to monitor predetermined parameters related to the behaviour of the vehicle. The second identification device is configured to compare the parameter(s) from the fourth sensor system with a predetermined set of rewardable behaviour scenarios stored in the second storing means for finding a reward matching the behaviour, wherein the second transceiver is configured to transmit a matching reward to the first transceiver when the predetermined parameters match a rewardable behaviour scenario.

According to another aspect, the second identification device, via the second transceiver, is further configured to receive a pre-determined vehicle parameter or set of vehicle parameters from a third sensor system in the vehicle connected to the first communication unit. The parameters are connected to the driving behaviour of the driver and the second identification device is configured to compare the parameter(s) from the third sensor system with a predetermined set of rewardable behaviour scenarios stored in the second storing means for finding a reward matching the behaviour, wherein the second transceiver is configured to transmit a matching reward to the first transceiver when the predetermined parameters match a rewardable behaviour scenario.

According to another aspect, the vehicle further comprises a second sensor system being configured to monitor a pre-determined parameter or set of vehicle parameters connected to the driving behaviour of the driver and the second transceiver is configured to send the parameter(s) from the second sensor system to the first identification device via the first transceiver.

According to another aspect, the second identification device is configured to identify a rewardable behaviour of the driver of the vehicle by input from a user of the second communication unit.

This disclosure also discloses a communication system comprising a first communication unit and a second communication unit according to the above.

This disclosure also discloses an integrated circuit card configured to perform the method in the first communication unit.

This disclosure also discloses an integrated circuit card configured to perform the method in the second communication unit.

This disclosure also discloses a vehicle comprising the first communication unit according to the above performing the methods according to the above.

This disclosure also discloses a vehicle comprising the second communication unit according to the above performing the corresponding methods according to the above.

This disclosure also discloses a computer program, comprising computer readable code which, when run on the first communication unit, causes the first communication unit to perform the corresponding method step(s) according to the above.

This disclosure also discloses a computer program, comprising computer readable code which, when run on the second communication unit, causes the first communication unit to perform the corresponding method step(s) according to the above.

BRIEF DESCRIPTION OF THE DRAWINGS

The present technique will be more readily understood through the study of the following detailed description of the embodiments/aspects together with the accompanying drawings, of which.

DETAILED DESCRIPTION

The general object or idea of embodiments of the present disclosure is to address at least one or some of the disadvantages with the prior art solutions. The various steps described below in connection with the figures should be primarily understood in a logical sense, while each step may involve the communication of one or more specific messages depending on the implementation and protocols used.

The general idea is to provide a method and device for allowing the possibility of directly rewarding a detected rewardable behaviour of a driver of a vehicle. Here, "directly" refers to a moment in time where the behaviour is detected in-situ and where the reward is being transmitted essentially immediately. More specifically and according to one aspect of the disclosure, the reward is transferred from one user of a communication unit to another user of a communication unit due to a rewardable behaviour. More specifically and according to another aspect of the disclosure, the reward is transferred from a road side unit comprising a communication unit to a user of another communication unit due to a rewardable behaviour. The communication unit belonging to the receiving party of the gift is either part of a vehicle or brought into the vehicle by the driver of the vehicle. The communication unit belonging to the transmitting party of the reward is either part of a vehicle, or brought into the vehicle by the driver of the vehicle or part of the road side unit.

In this application, the term "vehicle" is generally used to refer to a means of transportation. By way of example, a vehicle is an electrical vehicle or a fuel driven vehicle. By way of example, the vehicle is a car, a bus, a truck, a segway, a cart, a golf cart, a ship, an aircraft, or the like. An electrical vehicle uses one or more electric motors or traction motors for propulsion. An electrical vehicle may be powered by stored electricity originally from an external power source. Electrical vehicles include electric cars, electric trains, electric lorries, electric aero-planes, electric boats, electric motorcycles and scooters and electric spacecraft, or the like.

Figure 1:
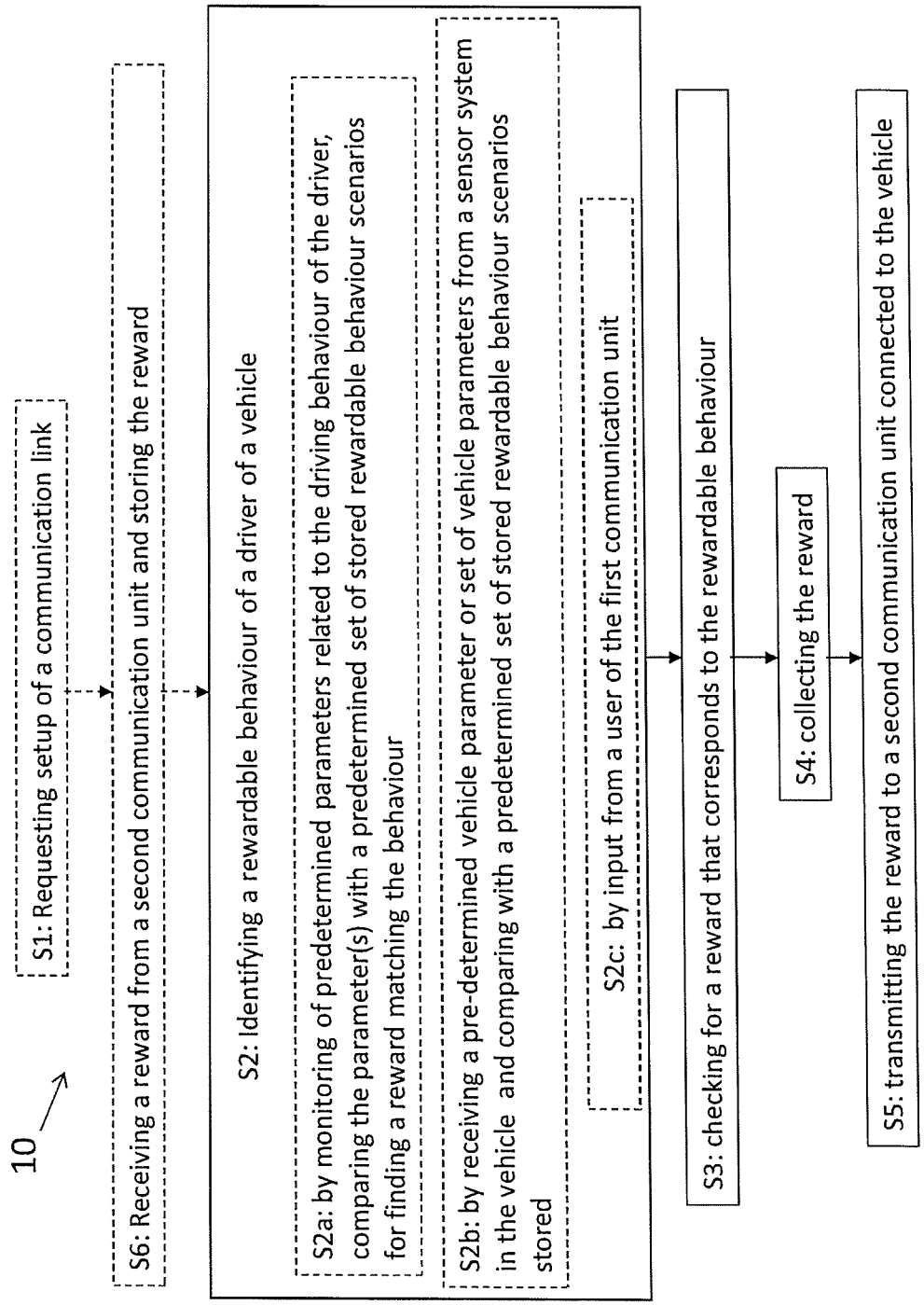
FIGS. 1-2 combined show a flow chart illustrating embodiments of method steps, performed in a first communication unit according to FIGS. 3 and 4.
Figure 2:
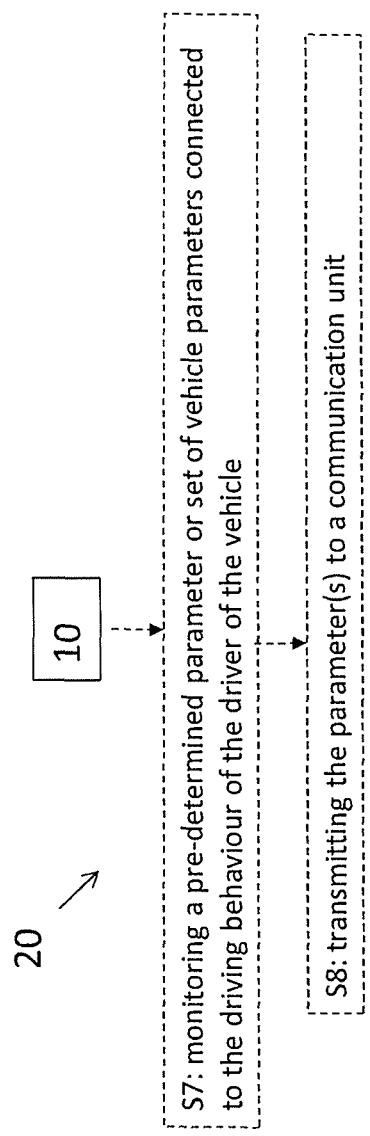

FIGS. 1-2 schematically discloses a method performed in a first communication unit 2, shown in FIGS. 5 and 6, and described below.

The method in the first communication unit 2 comprises the steps of identifying S2 a rewardable behaviour of a driver of a vehicle 9, checking S3 first storing means 6 for a reward that corresponds to the rewardable behaviour, collecting S4 the reward from the first storing means 6 and then transmitting S5 the reward to a second communication unit 3 connected to the vehicle 9.

One advantage of the method is the possibility to directly reward an identified and rewardable behaviour of a fellow driver. Here, "directly" refers to the possibility to react to a behaviour and instantly transmit a reward upon detection or identification. The identifying of the rewardable behaviour is done either by a human watching the vehicle or is done by a number of different identifying devices 8 connected to or being a part of the first communication unit The identifying of the rewardable behaviour may also be done by use of any suitable algorithm that can use information or data from the identifying device 8.

According to one aspect "collect" refers to a withdrawal of the reward. A withdrawal refers to a process where the reward is removed from the first storing means 6. According to one aspect, the withdrawal is presented to the user 10a of the first communication unit 2, for example via a visual display in the first communication devise 2 and/or via a sound and/or via a tactile event such as a vibration or the like. The examples should not be seen as limiting, but other suitable alternatives are possible. The first storing means 6 is also chargeable with new rewards for future withdrawals.

According to another aspect "collect" refers to a copy of the reward without withdrawal or to a corresponding information. Each copy is accounted for in the first communication unit. The user 10a of the first communication unit 2 is then either charged with an amount corresponding to the reward and/or informed that a reward has been collected. The amount is monetary or non-monetary. An example of a non-monetary amount is information on the number of rewards having been collected. The storing means is also chargeable with new rewards for future use.

Examples of rewardable behaviours or scenarios include:

Speed of vehicle remains less than a set speed limit, for example outside a school.

Vehicle in closest proximity changes direction at a rate faster than 15 degrees/second whilst on a straight section of road.

The vehicle slows at a rate greater than 2 m/s and minimum gap is less than 1 m between the vehicle eligible for a reward and a vehicle comprising the first communication unit.

The vehicle eligible for a reward slows and the distance between the vehicle and the vehicle in front of it increases to a distance of 20 m followed by the vehicle comprising the first communication unit changing direction at a rate greater than 5 degrees/second, i.e. the vehicle eligible for receiving the reward slows down to allow another vehicle to enter a line of traffic Compensation for a mistake made (e.g. braked sharply, waited for the Donor to move etc.).

The examples are not limiting, but other behaviours and scenarios are possible.

By way of example, the reward is in the form of either a voucher or token that can be exchanged for energy, or energy itself being delivered in-situ via a wireless charging technique for an electrical vehicle. Another example is that the reward is a credit on an account with an energy supplier. If the reward is in a form that it needs to be redeemed this is done. Examples of how this may be done include:

The transfer package includes a code that the driver then enters into a website provided by their energy supplier. Once the code is entered a credit is made on the driver's account.

The transfer package includes a code that the electrical vehicle driver enters into a public charging unit and free energy is supplied to the electrical vehicle.

The receiving vehicle drives over a wireless charging unit.

According to one example, the reward is accompanied by a message explaining the reason for the reward or any other information, for example the identity of the sender.

The communication unit carries out the action of transmitting the reward, and depending on embodiment, examples of how this might be achieved include:

Wireless communication of a voucher, token or similar item.

Transmission of the reward via an Internet connection subsequent to the activity taking place.

Sending information to wireless charging unit on the road ahead of the receiving vehicle that allows the wireless charging unit to transfer some charge to the receiver as it passes.

Wireless transfer of energy from the donor vehicle to the receiver vehicle.

Wireless charging units are able to inductively transfer energy from apparatus below the road to a vehicle. Current commercial implementations require the vehicle to be stationary, however future implementations may enable the transfer of energy whilst the vehicle is in motion.

The examples are not limiting, but other ways of transmitting or conveying rewards are possible.

According to one aspect, the method further comprises the steps of monitoring S2a predetermined parameters related to the driving behaviour of the driver 10, comparing S2a the parameters with a predetermined set of rewardable behaviour scenarios stored in the first storing means 6 for finding a reward matching the behaviour. A matching reward is then transmitted S5 to the second communication unit 3 when the predetermined parameters match a rewardable behaviour scenario. Before the reward is transmitted it is collected S4 from the first storing means 6 according to the above.

The monitoring step S2a is a part of identifying a rewardable behaviour of a driver of a vehicle 9. According to one aspect, the monitoring is done by a first sensor system 12 being configured to monitor predetermined parameters related to the behaviour of the vehicle 9. The first sensor system 12 is part of the first communication unit 2 or connected or connectable to the first communication unit 2. The first sensor system 12 comprises any suitable sensor equipment in order to identify and monitor a vehicle behaviour, for example radar, camera(s) and laser. The first sensors system 12 is part of or brought into vehicle 9b by a user or is part of a stationary unit 9b positioned to overview traffic.

By way of example, the sensor system monitors vehicles in their proximity and comprises identification of vehicles and tracking activity. By way of example, the proximity monitoring is done by video processing and/or radar using Digital Signal Processing (DSP) to separate radar signals and/or other such electromagnetic signals.

By way of example, the detected vehicle may be given a temporary identity by the communication unit, or the vehicle or driver identity may be found by:
 Using a technique such as video processing to scan the vehicles registration places/vehicle driver's face and then comparing this sensed data to data stored in an Information Database.
 The vehicle or an item associated with the driver, for example a smartphone, may transmit an identification signal that can be received by the donor.

By way of example, tracking activity of vehicles is done by sensors such as proximity/distance sensors and/or velocity sensors direction sensors and/or audio sensors (detecting noise levels or analysing acoustic signatures).

By way of example assessment of vehicle type, for example if the vehicle is an electrical vehicle or not, could be achieved by acoustic monitoring and/or sensing vibrations and/or the vehicle could transmit a signal indicating its type.

By way of example, the sensors are synchronized, such that activities sensed by multiple sensors can be correlated to a specific time.

By way of example, data transmitted to and from the communication unit is continuous, or dependent on a trigger, for example:
 Sensors may only communicate when an activity has been sensed that either qualifies as, or is able to contribute to, a qualifying scenario and/or a sensor transmits data on request from the communication unit.

In a further aspect the method further comprises the steps of receiving S2b a pre-determined vehicle parameter or set of vehicle parameters from a second sensor system 13 in the vehicle 9, the parameters being connected to the driving behaviour of the driver 10. After that, comparing S2b the parameters from the second sensor system 13 with a predetermined set of rewardable behaviour scenarios stored in the first storing means 6 for finding a reward matching the behaviour. After that transmitting S5 a matching reward to the second communication unit 5 when the predetermined parameters match a rewardable behaviour scenario.

The receiving step S2b is a part of identifying a rewardable behaviour of a driver of a vehicle 9. In order for the first communication unit 2 to be able to receive information from the second communication unit 3 and transmitting a matching reward to the second communication unit 3 when the predetermined parameters match a rewardable behaviour scenario, a communication link need to be established between the units exchanging information.

Hence, in a further aspect the method further comprises the step of the first communication unit 2 requesting S1 setup of a communication link 14 with the second communication unit 3.

According to one example, the request is being triggered by a user 10a of the first communication unit 2. The user 10a of the first communication unit 2 triggers the request for setup of the communication link 14 and a thereafter following transmission of a reward to the second communication unit according to the above when having identified and/or detected a rewardable behaviour himself. Hence, the user may on its own volition opt to trigger the transmission of the reward. By way of example, the trigger is done by voice command, wherein the first communication unit comprises means for receiving and interpreting voice signals, or the trigger is done by use of a signal from using the body or a part of the body wherein the first communication unit comprises means for identifying and interpreting such signals. Examples of such body signals are hand signal, eye movement, head movement and finger movement. According to another example, the trigger is done by mechanical transfer of a user action, wherein the first communication unit comprises means for reacting on the user action and interpreting the mechanical transfer. Examples of mechanical transfer of a user action is pressing a button, pulling a button, sweeping a screen or tapping a screen.

According to one example, the request is triggered by the second transceiver 5 being in range of the first transceiver 4. The request is sent automatically, or is sent after the user 10a of the first communication unit 2 having ordered the transmission of the request. The reason for ordering the request could be the will to transmit a reward according to the above.

According to another example, the request is triggered by the second communication unit 3 logging in on a network on which the first communication unit 2 being also logged in to. By way of example, the network comprises protocols for connecting different users, informing users on which users are logged on, or any other protocol for information exchange between users of the network. According to one aspect, the network is a dedicated network for enabling transmission of rewards to a user in the network community. The request is sent automatically, or is sent after the user of the first communication unit 2 having ordered the transmission of the request. The reason for ordering the request could be the will to transmit a reward according to the above.

According to an aspect of the disclosure, the step of identifying S2 a rewardable behaviour of the user of the vehicle 9 is done by input S2c from a user of the first communication unit 2 or is a result of an automatic step according to the above.

According to an aspect of the disclosure, the method further comprises the steps of receiving S6 a reward from the second communication unit 3. The reward is then stored S6 in the first storing means 6 for further use by the first communication unit 2 and/or for displaying the reward in the first communication unit 2.

According to one aspect, the first communication unit 2 comprises a display 2a for displaying the reward in the first communication unit 2. By way of example, the display 2a is a screen, or a touch screen, or a sound signal, or a visible signal such as light, or the like. The examples of displays 2a are not limiting, but other alternatives are possible.

According to one aspect, the method further comprising the steps of monitoring S7 a pre-determined parameter or set of vehicle parameters connected to the driving behaviour of the driver 10 of the vehicle 9b connected to the first communication unit 2, and transmitting S8 the parameter(s) to the second communication unit 2.

Figure 3:
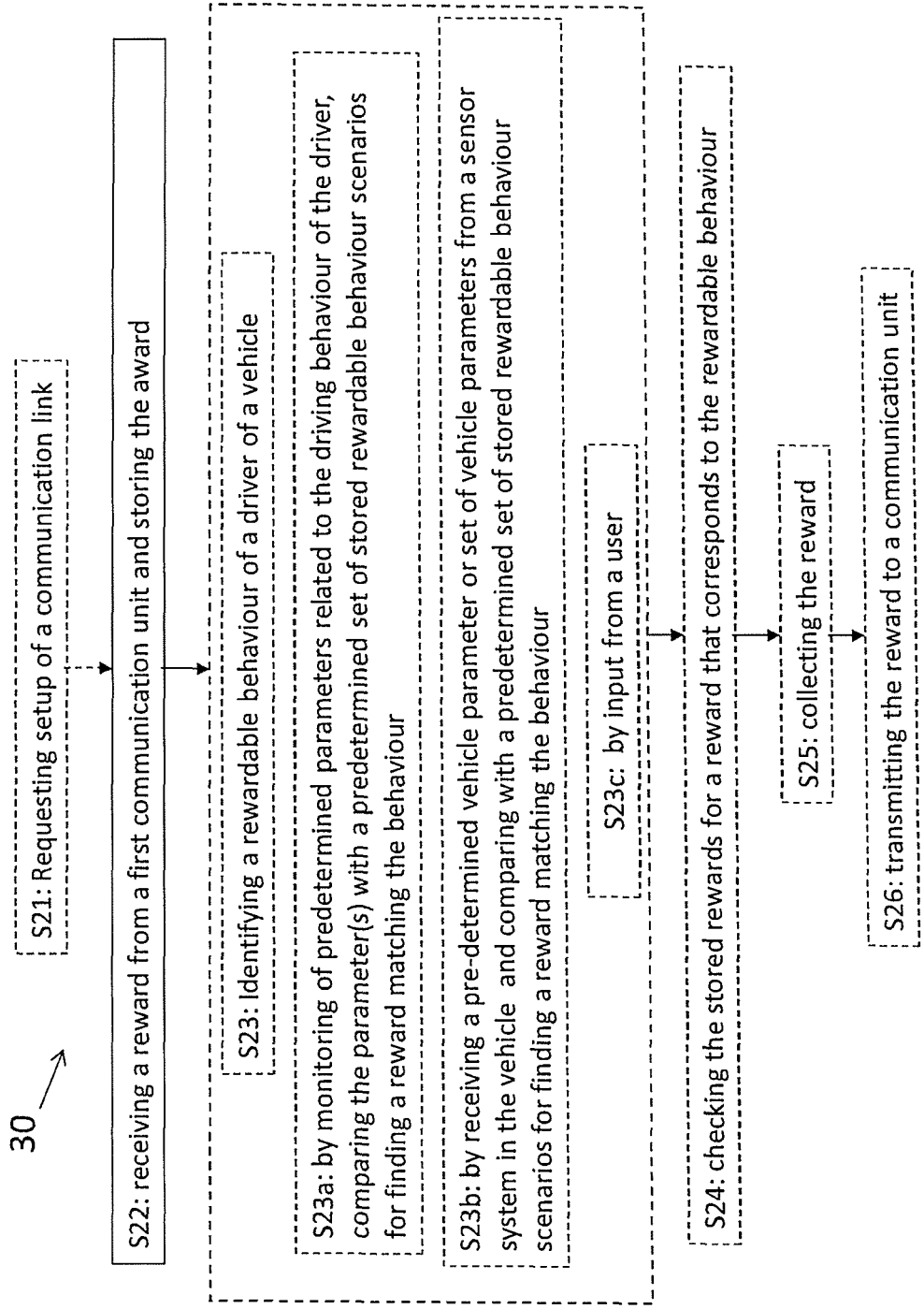
FIGS. 3-4 combined show a flow chart illustrating embodiments of method steps, performed in a second communication unit according to FIGS. 3 and 4.
Figure 4:
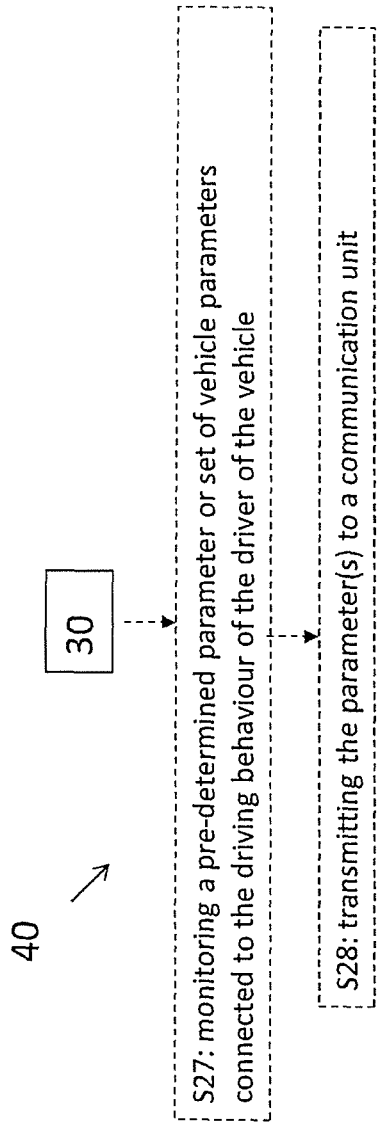

FIGS. 3-4 schematically discloses a method performed in a second communication unit 3 in a vehicle 9, shown in FIGS. 5 and 6, and described below.

The method in the second communication unit 2 comprises the steps of receiving S22 a reward from a first communication unit 2, storing S22 the reward in second storing means 7 for further use by the second communication unit 3 and/or for displaying the reward in the second communication unit 3.

The received reward is a consequence of a good behaviour identified by the first communication unit 2 or the user of the first communication unit 2.

According to one aspect, the second communication unit 3 comprises a display 3a for displaying the reward in the second communication unit 3. By way of example, the display 3a is a screen, or a touch screen, or a sound signal, or a visible signal such as light, or the like. The examples of displays 3a are not limiting, but other alternatives are possible.

According to an aspect of the disclosure, the method of the second communication unit 3 further comprises the step of identifying S23 a rewardable behaviour of a driver of a vehicle 9b connected to the first communication unit 2 or a third communication unit 11 and checking 524 the second storing means 7 for a reward that corresponds to the rewardable behaviour.

The reward is then collected S25 from the second storing means 7 and the reward is transmitted S26 to the first communication unit 2 or the third communication unit 11.

According to one aspect, the second communication unit 3 or the user of the second communication unit 3, in the same way as described in connection to the first communication unit 2, transmits S26 a reward to another communication unit. According to an aspect of the disclosure, the second communication unit 3 is identical to the first communication unit 3 with reference to identifying a rewardable behaviour and transmitting a corresponding reward.

According to another aspect of the disclosure, the method further comprises the step of monitoring S23a predetermined parameters related to the driving behaviour of the driver 10a, and comparing S23a the parameter(s) with a predetermined set of rewardable behaviour scenarios stored in the second storing means 7 for finding a reward matching the behaviour, and then transmitting S26 a matching reward to the first communication unit 2 when the predetermined parameters match a rewardable behaviour scenario. Before the reward is transmitted it is collected S25 from the second storing means 7 according to the above.

According to another aspect of the disclosure, the method further comprises the step of receiving S23b a pre-determined vehicle parameter or set of vehicle parameters from a third sensor system 12a in the vehicle 9b, the parameters being connected to the driving behaviour of the driver 10a, and comparing S23b the parameter(s) from the third sensor system 12a with a predetermined set of rewardable behaviour scenarios stored in the second storing means 7 for finding a reward matching the behaviour, and then transmitting S26 a matching reward to the communication unit 3 when the predetermined parameters match a rewardable behaviour scenario.

According to an aspect of the disclosure, the second communication unit 3 further comprises the steps of monitoring S27 a pre-determined parameter or set of vehicle parameters connected to the driving behaviour of the driver 10 of the vehicle 9 connected to the second communication unit 3 and transmitting S28 the parameters to the first communication unit 2

Here, the second communication unit 3 differs from the first communication unit 2 should the first communication unit 2 be a stationary unit 9b positioned to overview traffic since a stationary unit 9b lack vehicle parameters.

According to an aspect of the disclosure, the first communication unit 2 according to the above and the second communication unit 3 according to the above are comprised in a system and the method steps in the respective first and second communication units are valid accordingly.

Figure 5:
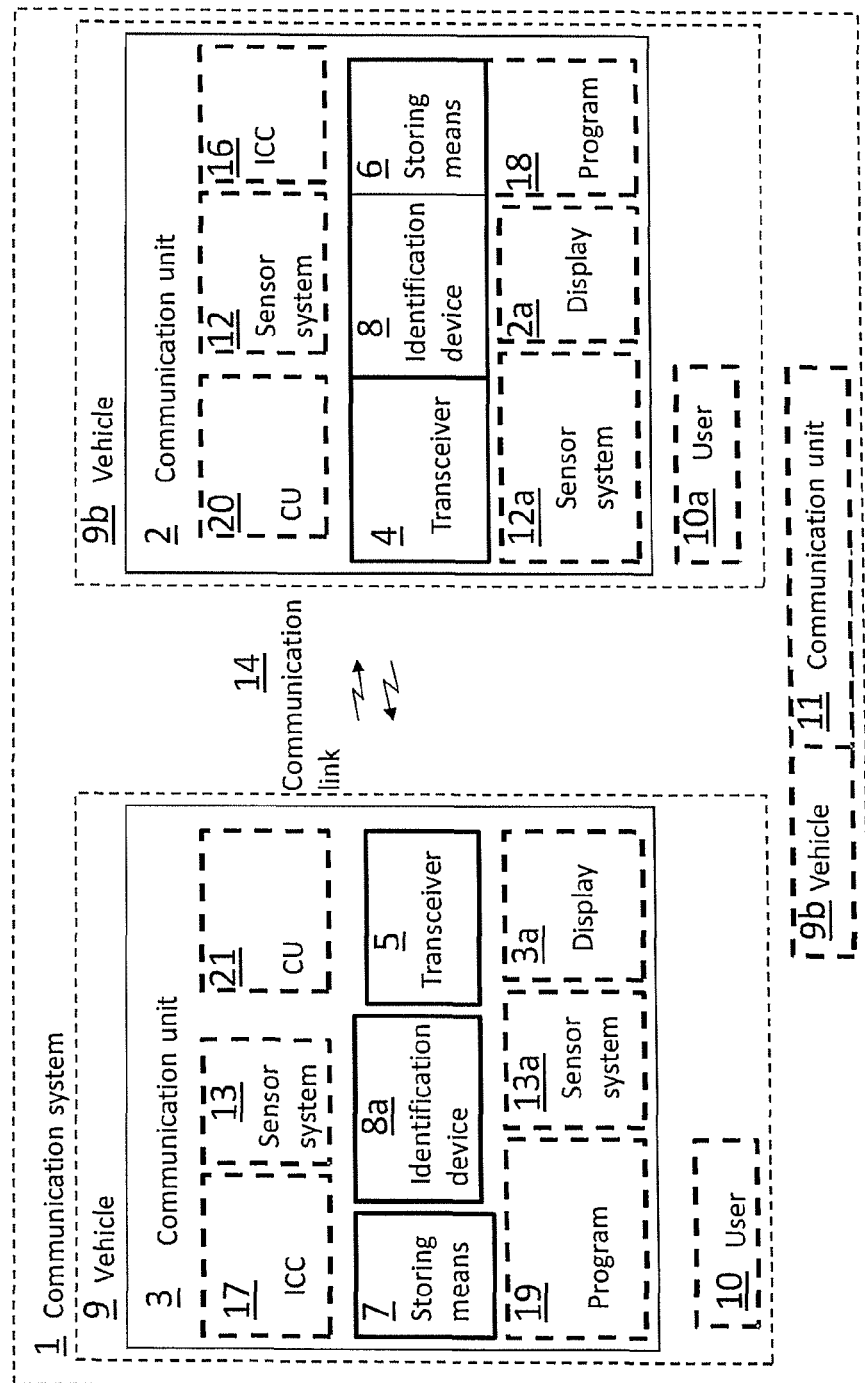
FIG. 5 schematically shows a system 1 comprising a first communication unit and a second communication unit.

FIG. 5 schematically shows a system 1 comprising a first communication unit 2 and a second communication unit 3.

The first communication unit 2 comprises a first transceiver 4. The first communication unit 2 comprises a first storing means 6 for storing awards. The first communication unit 3 comprises a first identification device 8 being configured to identify a rewardable behaviour of a driver of a vehicle 9 connected to the second communication unit 3.

The first transceiver 4 is any suitable transceiver that handles wireless data communication to and from the transceiver.

The first storing means 6 comprises one or more rewards that correspond to a rewardable behaviour. The first storing means 6 is charged with rewards and corresponding rewardable behaviours.

According to aspect, the first identification device 8 identifies the rewardable behaviour by a user judging over the behaviour and decides to reward the behaviour. The first identification device 8 is then triggered by a user 10a of the first communication unit 2. The user 10a of the first communication unit 8 identifies a rewardable behaviour and triggers the first identification device 8 to action. Hence, the user 10a may on its own volition opt to trigger the transmission of the reward. By way of example, the trigger is done by voice command, wherein the first communication unit comprises means for receiving and interpreting voice signals, or the trigger is done by use of a signal from using the body or a part of the body wherein the first communication unit comprises means for identifying and interpreting such signals. Examples of such body signals are hand signal, eye movement, head movement and finger movement. According to another example, the trigger is done by mechanical transfer of a user action, wherein the first communication unit comprises means for reacting on the user action and interpreting the mechanical transfer. Examples of mechanical transfer of a user action is pressing a button, pulling a button, sweeping a screen or tapping a screen.

According to another aspect, the first identification device 8 is configured to automatically identify a rewardable behaviour of a driver of a vehicle 9, which will be explained below.

The first identification device 8 is configured to check the first storing means 6 for a reward that corresponds to the rewardable behaviour. The first identification device 8 is configured to collect the reward from the first storing means 6.

The first identification device 8 is configured to communicate with the first transceiver 4 and the first transceiver 4 is configured to transmit the reward to the second communication unit 3.

According to one aspect, the first communication unit 2 is further configured to be connected to or comprising a first sensor system 12 being configured to monitor predetermined parameters related to the behaviour of the vehicle 9. The first identification device 8 is configured to compare the parameters from the first sensor system 12 with a predetermined set of rewardable behaviour scenarios stored in the first storing means 6 for finding a reward matching the behaviour. The first transceiver 4 is configured to transmit a matching reward to the second transceiver 5 when the predetermined parameters match a rewardable behaviour scenario. Before the reward is transmitted the first identification device 8 is configured to collect the reward from the first storing means 6 according to the above.

The monitoring step is a part of identifying a rewardable behaviour of a driver of a vehicle 9. According to one aspect, the monitoring is done by the first sensor system 12 being configured to monitor predetermined parameters related to the behaviour of the vehicle 9. The first sensor system 12 is part of the first communication unit 2 or connected or connectable to the first communication unit 2. The first sensors system 12 comprises any suitable sensor equipment in order to identify and monitor a vehicle behaviour, for example radar, camera(s) and laser. The first sensors system 12 is part of or brought into vehicle 9*b* by a user or is part of a stationary unit 9*b* positioned to overview traffic.

As been stated before, the first identification device 8 is configured to automatically identify a rewardable behaviour of a driver of a vehicle 9 by use of the sensor system 12, or that a user 10*a* triggers the first identification device 8 to identify a rewardable behaviour of a driver of a vehicle 9 by use of the sensor system 12.

According to one aspect, the first identification device 8, via the first transceiver 4, is further configured to receive a pre-determined vehicle parameter or set of vehicle parameters from a second sensor system 13 in the vehicle 9 being monitored. The parameters are connected to the driving behaviour of the driver 10. The first identification device 8 is configured to compare the parameters from the second sensor system 13 with a predetermined set of rewardable behaviour scenarios stored in the first storing means 6 for finding a reward matching the behaviour. The first transceiver 4 is configured to transmit a matching reward to the second transceiver 5 when the predetermined parameters match a rewardable behaviour scenario. One advantage with using predetermined parameters monitored in the vehicle, is the possibility for the first communication unit 2 to automatically react on the parameter by either automatically identifying and transmitting a reward that match a rewardable scenario matching the parameters, or to give the user of the first communication unit 2 an alert on a possible rewardable behaviour.

According to one aspect, the first communication unit 2 is further configured to request setup of a communication link 14 with the second communication unit 3. The request is triggered by a user of the first communication unit 2 or the request is triggered by the second transceiver 5 being in range of the first transceiver 4 or the request is triggered by the second communication unit 3 logging in on a network on which the first communication unit 2 being also logged in to.

According to one aspect, the first identification device 8 is further configured to identify a rewardable behaviour of the driver of the vehicle 9 by input from a user of the first communication unit 2. According to another aspect, the first identification device 8 is configured to identify a rewardable behaviour of the driver of the vehicle 9 by automatic input from the first communication unit 2 by use of the first sensor system 12.

According to one aspect, the first communication unit 2 is further configured to receive a reward from the second communication unit 3 and storing the reward in the first storing means 6 for further use by the first communication unit 2 and/or for displaying the reward in the first communication unit 2.

According to another aspect, the vehicle 9*b* further comprises a third sensor system 12*a* being configured to monitor a pre-determined parameter or set of vehicle parameters connected to the driving behaviour of the driver 10*a* connected to the first communication unit 2 and the first transceiver 4 is configured to send the parameter(s) from the third sensor system 12*a* a second identification device 8*a* via second transceiver 5 in the second communication unit 3.

The second communication unit 3 comprises a second transceiver 5 and a second storing means 7. The second transceiver 5 is configured to receive a reward from the first communication unit 2. The second transceiver 5 is configured to communicate with the second storing means 7 and the second storing means 7 is configured to store the reward for further use by the second communication unit 3 and/or for displaying the reward in the second communication unit 3.

The second transceiver 5 could be any known transceiver known in prior art that handles wireless data communication to and from the transceiver.

According to one aspect, the second communication unit 2 further comprises a second identification device 8*a*. The second identification device 8*a* is configured to identify a rewardable behaviour of a driver of a vehicle 9*b* connected to the first communication unit 2 or a third communication unit 11. The second identification device 8*a* is configured to check the second storing means 7 for a reward that corresponds to the rewardable behaviour. The second identification device 8*a* is configured to collect the reward from the second storing means 7.

According to one aspect "collect" refers to a withdrawal of the reward. A withdrawal refers to a process where the reward is removed from the second storing means 7. According to one aspect, the withdrawal is presented to the user of the first communication unit 2, for example via a visual display in the second communication devise 3 and/or via a sound and/or via a tactile event such as a vibration or the like. The examples should not be seen as limiting, but other suitable alternatives are possible. The first storing means 6 is also chargeable with new rewards for future withdrawals.

According to another aspect "collect" refers to a copy of the reward without withdrawal or corresponding information. Each copy is accounted for in the first communication unit. The user of the first communication unit is either charged with an amount corresponding to the reward and/or informed that a reward has been collected. The amount is monetary or non-monetary. An example of a non-monetary amount is information on the number of rewards having been collected. The storing means is also chargeable with new rewards for future use.

The second identification device 8*a* is further configured to communicate and transmit the reward to the first communication unit 2 or the third communication unit 11.

According to one aspect, the vehicle 9 comprises a second sensor system 13 being configured to monitor a pre-determined parameter or set of vehicle parameters connected to the driving behaviour of the driver 10. The second transceiver 5 is configured to send the parameters from the second sensor system 13 to the first identification device 8 via the first transceiver 4.

According to another aspect, the second communication unit 3 is further configured to be connected to or comprising a fourth sensor system 13a being configured to monitor predetermined parameters related to the behaviour of the vehicle 9b. The second identification device 8a is configured to compare the parameter(s) from the fourth sensor system 13a with a predetermined set of rewardable behaviour scenarios stored in the second storing means 7 for finding a reward matching the behaviour, wherein the second transceiver 5 is configured to transmit a matching reward to the first transceiver 4 when the predetermined parameters match a rewardable behaviour scenario. Before the reward is transmitted the second identification device 8a is configured to collect the reward from the second storing means 7 according to the above.

According to another aspect, the second identification device 8a, via the second transceiver 5, is further configured to receive a pre-determined vehicle parameter or set of vehicle parameters from a third sensor system 12a in the vehicle 9b connected to the first communication unit. The parameters are connected to the driving behaviour of the driver 10a and the second identification device 8a is configured to compare the parameter(s) from the third sensor system 12a with a predetermined set of rewardable behaviour scenarios stored in the second storing means 7 for finding a reward matching the behaviour, wherein the second transceiver 5 is configured to transmit a matching reward to the first transceiver 4 when the predetermined parameters match a rewardable behaviour scenario.

According to another aspect, the second identification device 8a is configured to identify a rewardable behaviour of the driver of the vehicle 9b by input from a user of the second communication unit 3.

Figure 6:
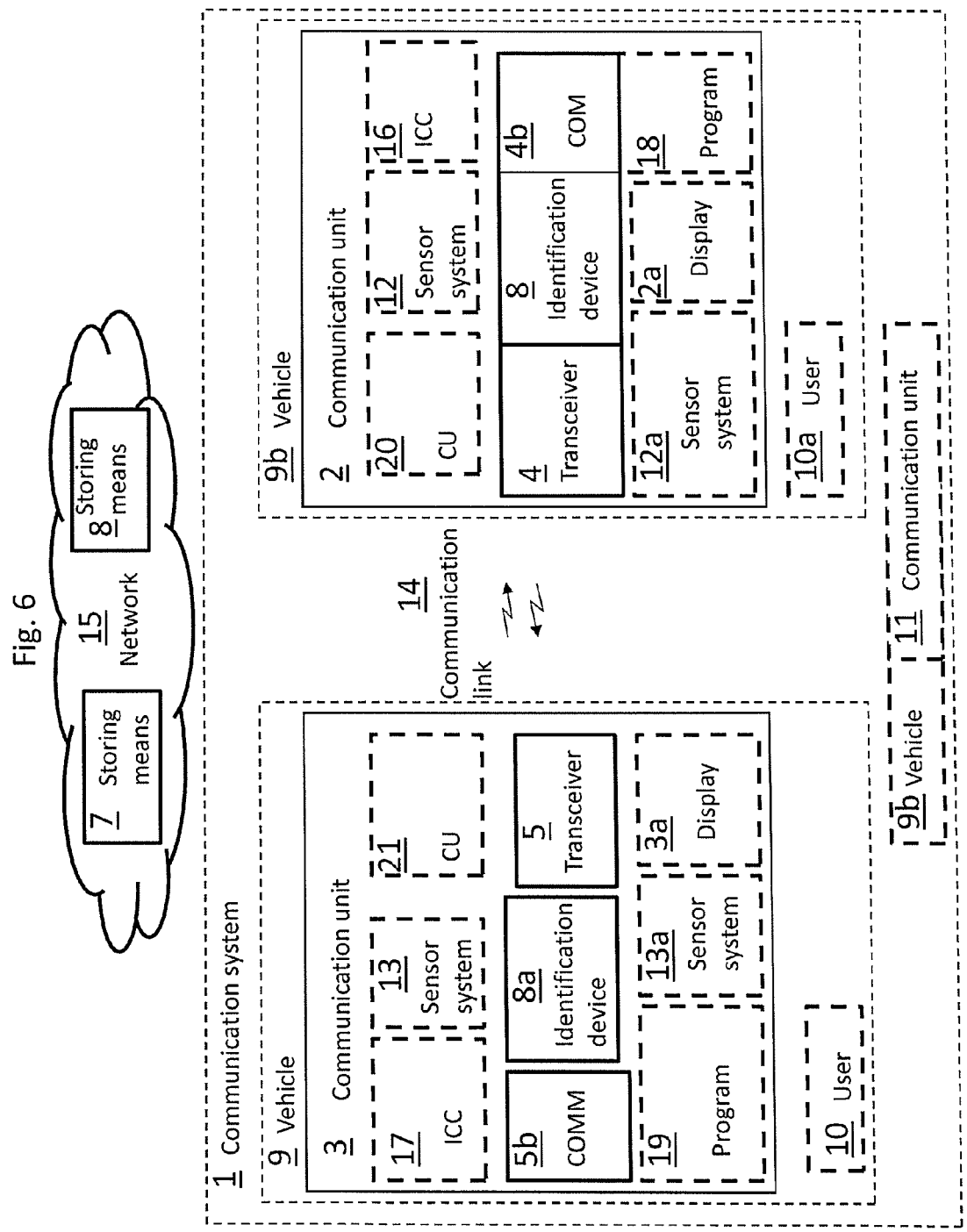
FIG. 6 schematically shows a system 1 comprising a first communication unit and a second communication unit.

FIG. 6 schematically shows a system 1 comprising a first communication unit 2 and a second communication unit 3 according to FIG. 5.

FIG. 6 is identical to FIG. 5, with the exception that the first storing means 6 is connected to the first communication unit 2 and the first communication unit 2 communicates with the first storing means 6 for access to the first storing means 6. By way of example, the first storing means 6 is part of a network 15 to which the first communication unit 3 has access. By way of example, the first communication unit 2 communicates with the first storing means 6 via the first transceiver 4, or via an additional communication means, COM, 4b for data communication, but is not restricted to the examples.

FIG. 6 is identical to FIG. 5 also with the exception that the second storing means 7 is connected to the second communication unit 3 and the second communication unit 3 communicates with the second storing means 7 for access to the second storing means 7. By way of example, the second storing means 7 is part of a network 15 to which the first communication unit 3 has access. By way of example, the second communication unit 3 communicates with the second storing means 7 via the second transceiver 5, or via an additional communication means, COM, 5b for data communication, but is not restricted to the examples.

With reference to FIGS. 1-6, the first storing means 6 and the second storing means 7 are any suitable memory device that can store data, for example magnetic devices, laser devices, semi-conductor devices, but is not restricted to the examples. The first storing means 6 and/or the second storing means 7 is either one entity for storing rewards and/or scenarios and and/or behaviours or a number of entities storing different data, for example one entity storing rewards and another entity storing scenarios and/or behaviours.

With reference to FIGS. 5 and 6 and according to one aspect of the disclosure, the system 1 comprises two identical communication units. By way of example, the system 1 comprises two first communication units 2 or the system comprises two second communication systems.

According to one aspect of the disclosure, the first communication unit 2 comprises an integrated circuit card, ICC, 16 configured to perform the method in the first communication unit 2 according to the above.

According to one aspect of the disclosure, the second communication unit 3 comprises an integrated circuit card, ICC, 17 configured to perform the method in the first communication unit 2 according to the above.

According to one aspect of the disclosure, the vehicle 9b comprises the first communication unit 2 according to the above.

According to one aspect of the disclosure, the vehicle 9 comprises the second communication unit 3 according to the above.

According to one aspect of the disclosure, a computer program 18 comprising computer readable code which, when run on the first communication unit 2, causes the first communication unit 2 to perform the method according to the above.

According to one aspect of the disclosure, a computer program 19 comprising computer readable code which, when run on the second communication unit 3, causes the second communication unit 3 to perform the method according to the above.

According to one aspect of the disclosure, the user of the second communication unit 3 is the driver of the vehicle 9.

According to one aspect of the disclosure, the user 10a of the first communication unit 2 is the driver of the vehicle 9b.

According to one aspect of the disclosure, the first communication unit 2 and/or the second communication unit 3 are mobile devices.

According to one aspect of the disclosure, the first communication unit 2 and/or the second communication unit 3 are mobile telephones.

According to one aspect of disclosure, the first communication unit 2 further comprises a control unit, CU, 20 and/or the second communication unit 3 further comprises a control unit, CU, 21. The control unit 20, 21 is able to communicate with the devices in the communication unit 2, 3 and/or the devices connected and/or connectable to the communication unit 2, 3. The communication can be done by any known means, for example wireless communication and/or wired communication, dependent on the communication format in the respective devices. The control unit 20, 21 is able to handle digital signals and/or analog signals, for example for calculations, comparison between signals and/or values, and other type of signal processing. The control unit 20, 21 coordinates the devices in FIGS. 5 and 6 in such way that the method steps described in connection to FIGS. 1-4 are performed in the correct order. The control unit 20, 21 is triggered by the user of the communication unit 2, 3 and/or by any of the devices in or connected to the communication unit, for example a sensor device having identified a possible rewardable behaviour.

The invention claimed is:

1. A method, performed in a first communication unit connected to a first vehicle, the method comprising:
the first communication unit using a first sensor system in the first vehicle to obtain data on a set of parameters related to driving behaviour of a second vehicle;
the first communication unit connected to the first vehicle identifying a rewardable behaviour for the second vehicle based on the data obtained with the first sensor system in the first vehicle;
the first communication unit checking a first storage device to determine whether there is a reward that corresponds to the rewardable behaviour;
in response to determining that there is a reward corresponding to the rewardable behaviour:
the first communication unit requesting establishment of a communication link between the first communication unit connected to the first vehicle and a second communication unit connected to the second vehicle, and
the first communication unit connected to the first vehicle transmitting, over the communication link and via a transceiver of the first communication unit, the reward to the second communication unit connected to the second vehicle.

2. The method according to claim 1, wherein the first sensor system comprises at least one of: a radar, a camera, and a laser,
wherein using the first sensor system to obtain the data is part of monitoring predetermined parameters related to the driving behaviour of a driver of the second vehicle, and
wherein identifying the rewardable behaviour comprises comparing the monitored pre-determined parameters with a predetermined set of rewardable behaviour scenarios stored in the first storage device for finding a reward matching the behaviour, and
the method further comprising transmitting a matching reward to the second communication unit when the predetermined parameters match a rewardable behaviour scenario, and wherein the transmitted reward comprises at least one of a voucher, a token, and a credit.

3. The method according to claim 1, further comprising:
receiving a pre-determined vehicle parameter or set of vehicle parameters from a second sensor system in the second vehicle, the received pre-determined vehicle parameter or set of vehicle parameters being connected to the driving behavior of a driver of the second vehicle,
wherein identifying the rewardable behaviour comprises comparing the received pre-determined vehicle parameter or set of parameters from the second sensor system in the second vehicle with a predetermined set of rewardable behaviour scenarios stored in the first storage device for finding a reward matching the behavior, and
the method further comprising transmitting a matching rewards to the communication unit when the predetermined parameters match a rewardable behaviour scenario.

4. The method according to claim 1, further comprising:
the first communication unit detecting at least one of: i) the second communication unit being within a predetermined range of the transceiver of the first communication unit, and ii) that the second communication unit has logged in on a network on which the first communication unit is also logged in;
in response to the detection, the first communication unit requesting setup of a communication link with the second communication unit.

5. The method according to claim 1 wherein identifying the rewardable behaviour is based on input from a user of the first communication unit.

6. The method according to claim 1, further comprising receiving a reward from the second communication unit; and
storing the reward in the first storage device and displaying the reward in the first communication unit.

7. The method according to claim 1, further comprising:
monitoring a pre-determined parameter or set of vehicle parameters connected to driving behaviour of the first vehicle; and
transmitting the monitored pre-determined parameter or set of vehicle parameters to the second communication unit connected to the second vehicle.

8. A method, performed in a second communication unit connected to a second vehicle, the method comprising:
the second communication unit connected to the second vehicle receiving a request to establish a communication link with a first communication unit connected to a first vehicle;
the second communication unit that is connected to the second vehicle receiving, over the communication link and via a transceiver of the second communication unit, a reward from the first communication unit connected to the first vehicle;
the second communication unit storing the reward in a second storage device:
wherein the received reward comprises at least one of a voucher, a token, and a credit, the method further comprising:
the second communication unit identifying a rewardable behaviour of a driver of the first vehicle connected to the first communication unit or a third communication unit;
the second communication unit checking the second storage device for a reward that corresponds to the rewardable behaviour; and
the second communication unit transmitting the reward to the first communication unit or the third communication unit.

9. The method according to claim 8, further comprising:
monitoring predetermined parameters related to the driving behaviour of the driver of the first vehicle;
wherein identifying the rewardable behaviour comprises comparing the monitored pre-determined parameters with a predetermined set of rewardable behaviour scenarios stored in the second storage device for finding a reward matching the behaviour, and
the method further comprising transmitting a matching reward to the first communication unit when the pre-determined parameters match a rewardable behaviour scenario.

10. The method according to claim 8, wherein identifying the rewardable behaviour of the driver of the first vehicle comprises:
receiving a pre-determined vehicle parameter or set of vehicle parameters from a sensor in the second vehicle, the parameters being connected to the driving behaviour of the driver in the first vehicle;
comparing the received pre-determined vehicle parameter or set of vehicle parameters with a predetermined set of rewardable behaviour scenarios stored in the second storage device for finding a reward matching the behavior, and the method further comprising transmitting a matching reward to the communication unit when the predetermined parameters match a rewardable behaviour scenario.

11. The method according to claim 8, wherein identifying a rewardable behaviour of the driver of the first vehicle is based on input from a user of the second communication unit.

12. The method according to claim 8, further comprising monitoring a pre-determined parameter or set of vehicle parameters connected to the driving behaviour of the driver of the second vehicle connected to the second communication unit; and
transmitting the monitored pre-determined parameters or set of vehicle parameters of the second vehicle to the first communication unit connected to the first vehicle.

13. A method, performed in a communication system comprising a first communication unit connected to a first vehicle and a second communication unit connected to a second vehicle, the method comprising:
the first communication unit using a first sensor system in the first vehicle to obtain data on a set of parameters related to driving behaviour of the second vehicle;
the first communication unit identifying a rewardable behaviour for the second vehicle based on the data obtained with the first sensor system in the first vehicle;
the first communication unit checking a first storage device to determine whether there is a reward that corresponds to the rewardable behaviour;
in response to determining that there is a reward corresponding to the rewardable behaviour:
the first communication unit requesting establishment of a communication link between the first communication unit connected to the first vehicle and the second communication unit connected to the second vehicle, and
the first communication unit that is connected to the first vehicle transmitting, over the communication link and via a transceiver of the first communication unit, the reward to the second communication unit connected to the second vehicle, wherein the reward comprises at least one of a voucher, a token, or credit; and
the second communication unit receiving, over the communication link, the reward from the first communication unit; and
the second communication unit storing the reward in a second storage device.

14. A first communication unit comprising:
a first transceiver connected to a first vehicle;
a first identification device configured to:
use a first sensor system in the first vehicle to obtain data on a set of parameters related to driving behaviour of a second vehicle;
identify, based on the data obtained with the first sensor system, a rewardable behaviour of a driver of the second vehicle;
check a first storage device for a reward that corresponds to the rewardable behaviour;
collect the reward from the first storage device;
request establishment of a communication link between the first communication unit and a second communication unit connected to the second vehicle; and
communicate, using the first transceiver connected to the first vehicle and over the communication link, the reward to the second communication unit connected to the second vehicle.

15. The first communication unit according to claim 14, wherein the first communication unit is configured to monitor predetermined parameters related to the behaviour of the second vehicle based on data from the first sensor system in the first vehicle, wherein the first identification device is configured to identify the rewardable behaviour by comparing the monitored predetermined parameters from the first sensor system in the first vehicle with a predetermined set of rewardable behaviour scenarios stored in the first storage device for finding a reward matching the behaviour, wherein the first transceiver is configured to transmit a matching reward to the second transceiver when the predetermined parameters match a rewardable behaviour scenario.

16. The first communication unit according to claim 14, wherein the first identification device, via the first transciever, is configured to receive a predetermined vehicle parameter or set of vehicle parameters from a second sensor system in the second vehicle, the received predetermined vehicle parameter or set of vehicle parameters being connected to the driving behaviour of the driver in the second vehicle, wherein the first identification device is configured to compare the received predetermined vehicle parameter or set of vehicle parameters from the second sensor system in the second vehicle with a predetermined set of rewardable behaviour scenarios stored in the first storage device for finding a reward matching the behaviour, wherein the first transceiver is configured to transmit a matching reward to a second transceiver when the predetermined parameters match a rewardable behaviour scenario.

17. The first communication unit according to claim 14, wherein the first communication unit is configured to detect at least one of: i) the second communication unit being within a predetermined range of the transceiver of the first communication unit, and ii) that the second communication unit has logged in on a network on which the first communication unit is also logged in, and to, in response to the detection, request setup of a communication link with the second communication unit.

18. The first communication unit according to claim 14, wherein the first identification device is configured to identify a rewardable behaviour of a driver of the second vehicle based on input from a user of the first communication unit.

19. The first communication unit according to claim 14, wherein the first communication unit is configured to receive a reward from the second communication unit and store the reward in the first storage device and display the reward in the first communication unit.

20. The first communication unit according to claim 14, wherein the vehicle connected to the first communication unit comprises a third sensor system configured to monitor a pre-determined parameter or set of vehicle parameters connected to the driving behaviour of the first vehicle and wherein the first transceiver is configured to send the monitored pre-determined parameter or set of vehicle parameters from the third sensor system to a second identification device via a second transceiver in the second communication unit.

21. A second communication unit comprising:
a second transceiver connected to a second vehicle,
wherein the second transceiver that is connected to the second vehicle is configured to:
receive a request to establish a communication link with a first communication unit connected to a first vehicle;
receive, over the communication link, a reward from the first communication unit connected to the first vehicle; and communicate with a second storage device, wherein the second storage device is configured to store a reward;

the second communication unit comprising a second identification device, wherein:

the second identification device is configured to:

identify a rewardable behaviour of a driver of the first vehicle or a third communication unit;

check the second storage device for a reward that corresponds to the rewardable behaviour;

collect the reward from the second storage device; and the second identification device is configured to communicate and transmit the reward to the first communication unit or the third communication unit.

22. The second communication unit according to claim 21, wherein the second communication unit is configured to be connected to or comprising a fourth sensor system configured to monitor predetermined parameters related to the behaviour of the first vehicle, wherein the second identification device is configured to compare the monitored predetermined parameters from the fourth sensor system with a predetermined set of rewardable behaviour scenarios stored in the second storage device for finding a reward matching the behaviour, wherein the second transceiver is configured to transmit a matching reward to the first transceiver when the predetermined parameters match a rewardable behaviour scenario.

23. The second communication unit according to claim 21, wherein the second identification device, via the second transciever, is configured to receive a predetermined vehicle parameter or set of vehicle parameters from a third sensor system in the first vehicle, the received predetermined vehicle parameter or set of vehicle parameters being connected to the driving behaviour of the driver of the first vehicle, wherein the second identification device is configured to compare the received predetermined vehicle parameter or set of vehicle parameters from the third sensor system with a predetermined set of rewardable behaviour scenarios stored in the second storage device for finding a reward matching the behaviour, wherein the second transceiver is configured to transmit a matching reward to the first transceiver when the predetermined parameters match a rewardable behaviour scenario.

24. The second communication unit according to claim 21, wherein the second identification device is configured to identify a rewardable behaviour of the driver of the first vehicle based on input from a user of the second communication unit.

25. The second communication unit according to claim 21, wherein the second vehicle comprises a second sensor system configured to monitor a predetermined parameter or set of vehicle parameters connected to the driving behaviour of the second vehicle, wherein the second transceiver is configured to send the monitored predetermined parameter or set of vehicle parameters from the second sensor system to a first identification device in the first vehicle via the first transceiver.

26. A communication system comprising a first communication unit and a second communication unit, wherein the first communication unit comprises a first transceiver connected to a first vehicle and a first identification device configured to:

identify a rewardable behaviour of a driver of a second vehicle connected to the second communication unit;

check a first storage device for a reward that corresponds to the rewardable behaviour;

collect the reward from the first storage device; and request establishment of a communication link between the first communication unit connected to the first vehicle and the second communication unit connected to the second vehicle;

communicate, using the first transceiver connected to the first vehicle and over the communication link, the reward to the second communication unit connected to the second vehicle; and the second communication unit comprises:

a second transciever connected to the second vehicle, the second communication unit comprising or being connected to a second storage device;

wherein the second transceiver is configured to receive a request from the first communication unit to establish the communication link with the first communication unit and to receive a reward from a first communication unit via the communication link; and wherein the second transceiver is configured to store the reward in the second storage device.

27. A first vehicle comprising a first communication unit, wherein the first communication unit comprises a first transceiver and comprises or is connected to a first storage device configured to store rewards, the first communication unit further comprising a first identification device configured to:

identify a rewardable behaviour of a driver of a second vehicle connected to a second communication unit connected to a second vehicle;

check the first storage device for a reward that corresponds to the rewardable behaviour;

collect the reward from a first storage device; and request establishment of a communication link between the first communication unit connected to the first vehicle and the second communication unit connected to the second vehicle;

communicate, using the first transceiver and over the communication link, the reward to the second communication unit connected to the second vehicle.

* * * * *